Feb. 19, 1924. 1,484,084
F. L. ROHRBACH
GRASS CATCHER FOR LAWN MOWERS
Filed Sept. 3, 1921
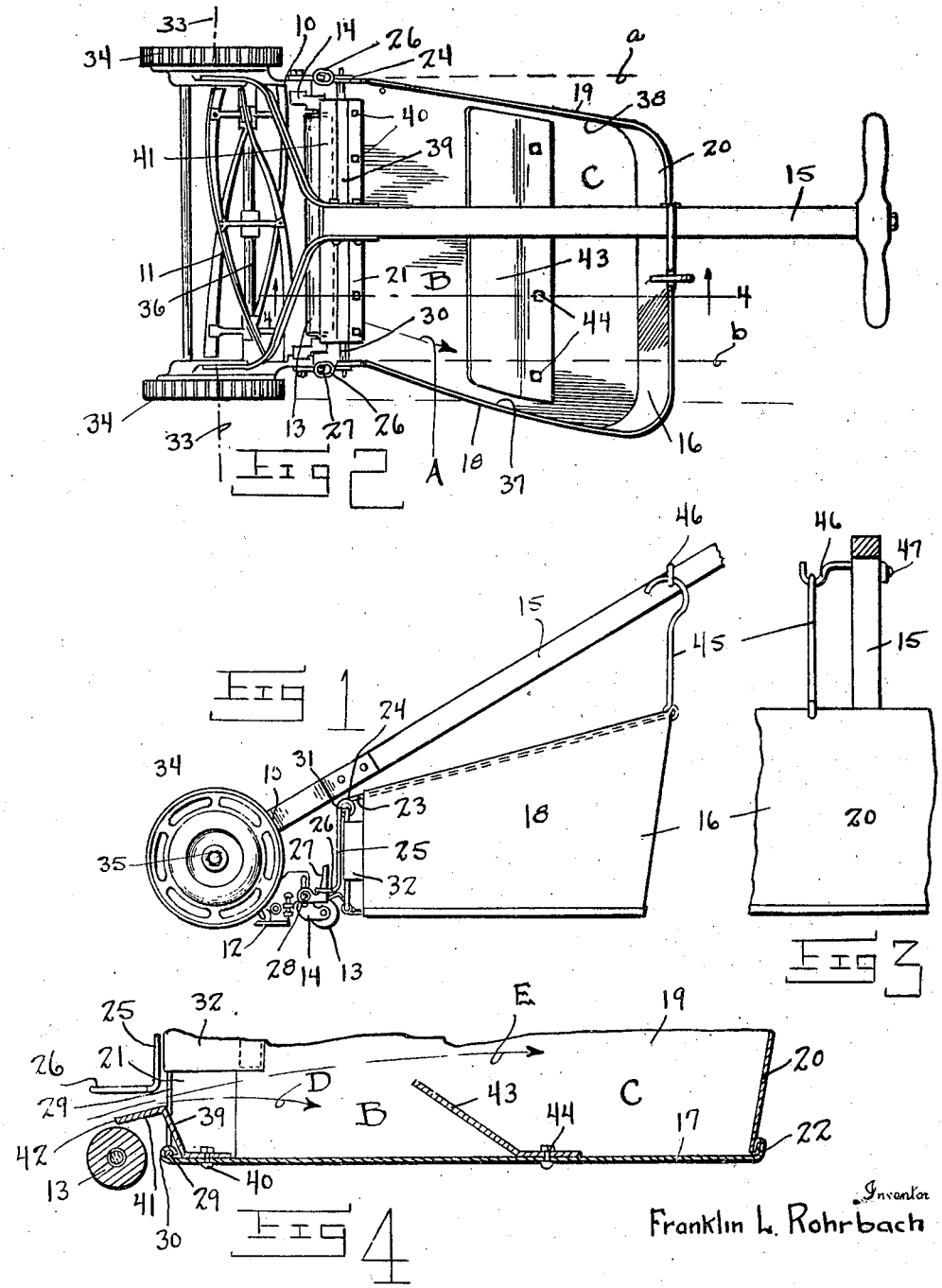

Patented Feb. 19, 1924.

1,484,084

UNITED STATES PATENT OFFICE.

FRANKLIN L. ROHRBACH, OF SPOKANE, WASHINGTON.

GRASS CATCHER FOR LAWN MOWERS.

Application filed September 3, 1921. Serial No. 498,274.

*To all whom it may concern:*

Be it known that I, FRANKLIN L. ROHRBACH, a citizen of the United States, and a resident of Spokane, in the county of Spokane and State of Washington, have invented certain new and useful Improvements in Grass Catchers for Lawn Mowers, of which the following is a specification.

While all grass-catcher attachments for lawn mowers have approximately the same cubical capacity, heretofore their efficiency has been comparatively low by reason of the fact that it was necessary to empty the catchers long before they were filled and for the further reason that the operator had frequently to stop the cutting operation to enable him to manually even up the distribution of the cut grass over the bottom of the catcher.

Therefore it is the principal object of this invention to provide a device of the character described which is so designed as to retain the maximum amount of grass before being emptied and to dispense with the necessity of the operator frequently stopping the cutting operation to manually distribute the cuttings over the bottom of the catcher.

A further object is to provide a device of the character described wherein one or both sides of the catcher are so arranged with respect to the mower frame that such side or sides extend approximately in the direction of the discharge stream of grass cut by the mower knives.

A further object is to provide a device of the character described wherein means are provided to retain the cut grass within the catcher while the cutting operation is taking place and yet not interfere with the expeditious emptying of the catcher.

Further objects will be more fully described in connection with the accompanying specification and more particlarly pointed out in and by the appended claims.

In the drawings:—

Figure 1 is a side elevation of a lawn mower showing my grass-catcher attached thereto.

Figure 2 is a plan view of Figure 1.

Figure 3 is a broken away end elevation of Figure 2.

Figure 4 is an enlarged section on line 4—4 of Figure 2.

Similar numerals designate the same parts throughout the various figures of the drawings.

A lawn mower frame is shown at 10 and carries the usual mower knives 11, knife plate 12 with which knives 11 co-act to perform the grass cutting operation, roller 13, carried by roller brackets 14, and handle 15.

The body portion of the grass catcher 16 consists of the bottom 17, side walls 18 and 19 and back 20, the front being open to form mouth 21. Preferably, the bottom 17 is constructed of a rigid material such as sheet metal while sides 18 and 19 and end 20 are constructed of a fabric such as canvas, the fabric sides and ends being secured to the rigid bottom by any suitable means such as by interfolding the overlapping edges of the fabric and metal to form a seam such as 22.

While any suitable means may be employed for retaining the fabric portion in position and for attaching the catcher 16 to power frame 10, for the purpose of illustration I have shown these means as comprising the following:—

Wire 23 is suitably secured to the upper edges of sides 18 and 19 and back 20 and, after being coiled as at 24 depends as at 25 and terminates in loops 26, which are adapted to be removably held by brackets 27 secured to mower frame 10 at 28. The front edge of the bottom 17 is turned over wire 29 as at 30 and wire 29 extends upwardly to form loop connections at 31 with coils 24. Sides 18 and 19 are secured to wires 29 by strips of fabric 32.

It will be noted by reference to Figure 2 that the front edge 30 of bottom 17 is substantially parallel with roller 13 and that roller 13 is substantially parallel with a center line 33 drawn between the centers of wheels 34, the latter being journaled to frame 10 as at 35, these parallel relations being true of all lawn mowers and grass catchers attached thereto. In order to give a shearing effect to the cutting members the plate 12 and the center shaft 36 supporting mower knives 11 are set at a slight angle with relation to center line 33 and hence to roller 13. This angular relation is true in all mowers observed. As a consequence, the direction of the discharge stream of the grass being cut by the knives 11 is not at right angles to the center line 33 and roller 13 but rather in approximately the direction of arrow A (Figure 2).

The side edges of the bottom members of the usual grass-catchers extend at right angles to the rollers corresponding to roller 13, as indicated by dash lines *a* and *b*, resulting in a rapid accumulation of cut grass along the edge *b* and lack of accumulation along edge *a*, thus necessitating the frequent manual operation of pushing the large accumulation of grass away from edge *b* towards edge *a*. To remedy this fault and thus eliminate a great deal of lost time, I have constructed the edge 37 of bottom 17 at an angle of greater than 90° with respect to front edge 30 so that said edge and also side 18 extends approximately in the direction of the discharge stream of grass being cut by mower knives 11.

For the purpose of reducing useless bulk of material I may cut edge 38 of bottom 17 at approximately the angle shown in Figure 2, so that the width of catcher 10 corresponds approximately with the width of the discharge stream of grass. It will be understood that some lawn mowers are constructed so that the direction of the discharge stream is towards edge *a* instead of *b*, in which case edge 38 will be formed to follow the direction of the discharge stream.

Along the forward edge 30 I have provided an upwardly extending flange 39 secured to bottom 17 by bolts 40 or, if desired, flange 39 may be made integral with bottom 17. Flange 39 may be slightly inclined in a forward direction to facilitate the emptying of the catcher. Guide member 41 extends forwardly from the top of flange 39 and is inclined downwardly so that its forward edge 42 approximately superposes the center of roller 13 and has clearance therefrom.

I have arranged a transverse partition 43 secured to bottom 17 by bolts 44 dividing catcher 16 into compartments B and C.

Guide 41 not only serves to prevent cut grass from escaping between roller 13 and edge 30 but also guides the cut grass into compartments B and C. When knives 11 are revolved comparatively slowly, guide 41 will direct the cut grass into compartment B as indicated by arrow D, while, when knives 11 are revolved at a comparatively high speed, guide 41 will direct the grass into compartment C as indicated by arrow E. Should the knives be driven at a comparatively high speed continuously, compartment C will first be filled and then the excess cuttings will roll over partition 43 to fill compartment B. It will be seen that the forwardly inclined partition will permit the cut grass from compartment C, to freely discharge over said partition when the catcher is detached from the mower and inclined into a dumping position.

Partition 43 holds the bulk of the cut grass in compartment C and thus prevents it from sliding towards the front of the catcher where it would otherwise thrust the cut grass in compartment B out of the catcher. Flange 39 prevents the escape of cut grass from compartment B. It will be noted that flange 39 is necessarily comparatively low in order to allow for the ingress of cut grass, but it serves its purpose since partition 43 retains the bulk of the grass in compartment C. Partition 43 is inclined forwardly in order to facilitate the emptying of the catcher. I may also provide a plurality of partitions 43 in grass catchers of large size.

Any suitable means may be provided for maintaining the catcher 10 in proper relation to handle 15, I having shown for the purpose of illustration a hook 45 secured to the upper edge of back 20 and adapted to be removably hooked over hook 46 secured to handle 15 at 47.

While I have herein shown and described the preferred embodiment of my invention I do not wish to be limited thereto except for such limitations as the claims may import.

I claim:—

1. A grass catcher for a lawn mower wherein the stream of cut grass flows at a lateral angle to the medial line of the mower, comprising a catcher body having a forward edge adapted for attachment to the mower in substantially parallel relation with the transverse axis of the latter, said body extending laterally of the medial line of the mower from the front to the rear end of said body sufficiently to dispose the medial line of said body substantially coincident with the medial line of flow of the cut grass from the mower.

2. A grass catcher for attachment to a lawn mower, comprising a catcher body having an intake end and provided with bottom and side walls, and a partition dividing said body into front and rear compartments to prevent the grass in the rear compartment from sliding forwardly, and said partition being inclined from the bottom of said body toward said intake end to facilitate release of the grass from said rear compartment when dumping the contents from said body.

In testimony whereof, I hereby affix my signature.

FRANKLIN L. ROHRBACH.